(No Model.)

J. BOERI.
FRUIT STONER.

No. 519,939. Patented May 15, 1894.

WITNESSES:
C. Neveux
C. Sedgwick

INVENTOR
J. Boeri
BY
Munn & Co
ATTORNEYS.

UNITED STATES PATENT OFFICE.

JOSEPH BOERI, OF NEW YORK, N. Y.

FRUIT-STONER.

SPECIFICATION forming part of Letters Patent No. 519,939, dated May 15, 1894.

Application filed December 5, 1893. Serial No. 492,867. (No model.)

*To all whom it may concern:*

Be it known that I, JOSEPH BOERI, a citizen of the Republic of France, at present residing in New York city, in the county and State of New York, have invented a new and Improved Fruit-Stoner, of which the following is a full, clear, and exact description.

The object of the invention is to provide a new and improved tool, for conveniently and readily removing the stones from olives, cherries, peaches and other stone carrying fruit.

The invention consists of certain features of construction that will be hereinafter described and claimed.

Reference is to be had to the accompanying drawings, forming a part of this specification, in which similar letters of reference indicate corresponding parts in all the figures.

Figure 1:
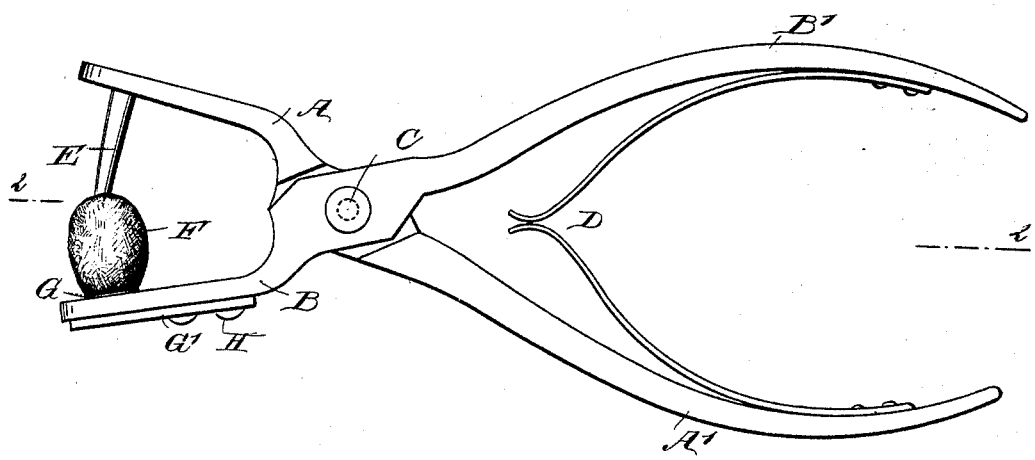
Figure 2:
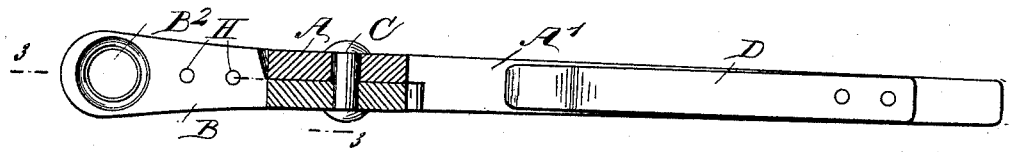
Figure 3:
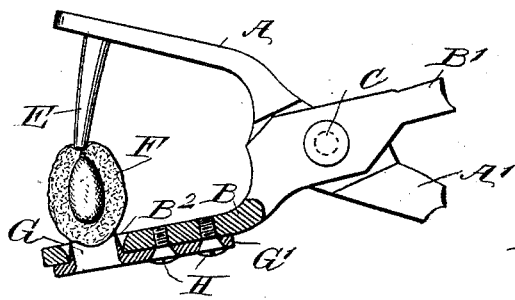
Figure 4:
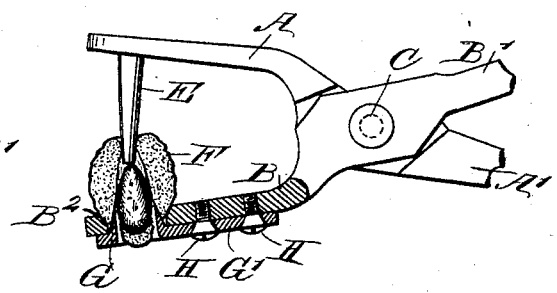

Figure 1 is a side elevation of the improvement. Fig. 2 is a sectional plan view of the same on the line 2—2 of Fig. 1. Fig. 3 is a sectional side elevation of the improvement showing the fruit in place; and Fig. 4 is a similar view of the same with the parts in a different position.

The improved implement is provided with two jaws A and B, pivotally connected with each other at C, and provided with handles A' and B' respectively, adapted to be taken hold of by the operator to conveniently manipulate the said jaws A and B, so as to move the same toward each other; the return movement being accomplished by springs D, held between the handles A' and B', as is plainly shown in Fig. 1. On the forward end of the jaw A is secured or formed a downwardly extending male die E, arranged in the shape of a pin and adapted to pass through the fruit F, to remove the stone therefrom, as hereinafter more fully described. The lower end of the fruit F, is set on a female die G, provided at its lower end with a shank G' secured by set screws H, or other suitable means to the under side of the jaw B. The female die G, is preferably made circular with a central opening, and a sharp circular edge at its upper end, the said die projecting into an opening $B^2$ formed in the jaw B, and having a beveled wall to form an annular recess or chamber between the jaw B and the die G, as is plainly indicated in Figs. 2, 3 and 4. The upper end or cutting edge of the female die G, projects slightly above the top surface of the jaw B, while the lower end of the said die fits snugly into the smallest diameter of the opening $B^2$.

The tool is used as follows: The jaws A and B, are normally held open by the springs D, to permit of conveniently inserting the fruit F on the upper cutting edge of the female die G. The operator then presses the handles A' and B' toward each other, so that the male die E passes into the upper end of the fruit F, engages the stone and forces the same downward; at the same time pressing the lower end of the fruit F firmly in contact with the cutting edge of the female die G, so that part of the lower end of the said fruit F is cut to permit the downwardly moving stone to readily pass through the opening in the female die, with the portion cut by the female die.

It is understood that as the fruit F moves downward by the pressure above described, it enters the annular recess formed between the die G and the jaw B, and becomes firmly seated in the beveled wall of the opening $B^2$, during the time the male die E finally presses the stone F through the opening in the female die G; it being understood that the said male die E, is in alignment with the opening of the said female die G.

It will be seen that by this tool, fruit, such as olives, cherries, peaches and the like, can be readily treated to remove the stone very rapidly, and without the operator soiling his fingers.

Having thus fully described my invention, I claim as new and desire to secure by Letters Patent—

A fruit stoner, comprising a pair of pivoted jaws one of which has a transverse aperture, a female die secured to the apertured jaw and projecting into the opening thereof, yet spaced at its projecting end, from the walls of the said opening, so as to leave an annular recess or chamber between the female die and the jaw to which it is secured, and a male die secured to the other jaw and adapted to enter the female die, substantially as described.

JOSEPH BOERI.

Witnesses:
 E. I. MATHEWSEN,
 WILLIAM H. REAKLING.